3,471,616
β-STYRENESULFONYL AZIDE AND METHOD AND COMPOSITION FOR COMBATTING HYPERTENSION THEREWITH
Theodor Weil, New Brunswick, and Hugo Stange, Princeton, N.J., assignors to FMC Corporation, New York, N.Y., a corporation of Delaware
No Drawing. Filed Sept. 22, 1965, Ser. No. 489,426
Int. Cl. A61k 27/00; C07d 109/00
U.S. Cl. 424—226                                      9 Claims

ABSTRACT OF THE DISCLOSURE

The new compound, β-styrenesulfonyl azide, is a hypotensive agent that can be safely administered to animals over an extended period of time sufficient to lower blood pressure.

---

This invention relates to the control of blood pressure in mammals and aims to provide a new method of combatting hypertension and a hypotensive agent and composition for use in that method.

The prevalence and persistence of hypertension and the serious physical disorders that are associated therewith have prompted extensive searching for chemotherapeutic agents which can be safely administered over an extended period of time to reduce blood pressure, particularly diastolic pressure, without producing untoward toxic manifestations or deleterious side effects. It is highly desirable that a hypotensive agent exhibit, not only low toxicity and absence of side effects, but also long duration of activity and smoothness and stability of action so that the desired reduction of blood pressure may be achieved through the administration of substantially constant dosage levels of the drug which will continue to be effective over the longest possible intervals. The search for a hypotensive agent having such properties has not been entirely successful.

We have discovered that the hitherto unknown compound β-styrenesulfonyl azide, like the aromatic and lower alkylbenzenesulfonyl azides which form the subject of our pending application, Ser. No. 398,072, filed Sept. 21, 1964, is a stable hypotensive agent of very low toxicity which exhibits smooth and prolonged activity of a high order. This was surprising because various azides had been included among the compounds that have been tested for hypotensive activity by others with discouraging results. For instance, the use of sodium azide is well known but this compound is quite toxic. Different organic azides have also been tested in the past but they have been found to be ineffective or too fleeting in their action or of insufficient potency to permit their use as effective hypotensive agents. Hence, the organic azides could not have been regarded as a promising field within which a superior hypotensive agent might be found.

Our new compound is particularly noteworthy in the respect that it exhibits antihypertensive activity on oral administration and moderate increases in the size of a non-toxic but effective dose thereof will result in a proportionate increase in the duration of hypotensive effect but not in the degree thereof, and without an observable increase in toxic manifestation. While the properties which render the compounds forming the subject of our aforesaid pending application, Ser. No. 398,072, filed Sept. 21, 1964, valuable as effective and safe antihypertensive drugs are shared by β-styrenesulfonyl azide, it differs from those first mentioned compounds in degree of activity, manifesting an even lower acute oral toxicity ($LD_{50}$). The low order of toxicity of our new compound has been established as follows:

Male albino rats weighing from 150 to 250 grams were used. All rats were fasted overnight and then administered orally 100, 215, 464, 1000, 2150 or 4640 mg./kg. to 5 rats at each respective dosage level. The β-styrenesulfonyl azide was suspended in an aqueous dispersion of an inert thickening agent prior to administration. All rat groups were administered a constant volume of 1 ml./100 grams of body weight of the preparation at all dosage levels.

The rats were housed in metal cages prior to, and after the oral administration of the test agent. Food and water were available at all times after the administration of the compound.

The rats were observed for evidence of pharmacodynamic and/or toxic effects after administration of the test agent at 0–30 minutes, 30–60 minutes, 60–150 minutes, 150–300 minutes; at 24 hours; and once daily thereafter for a total of 14 days.

Animals dying during the period of observation were necropsied.

(A) Pharmacodynamic and/or toxic signs (1) 100, 215, 464, and 1000 mg./kg.,—Animals at these dosage levels appeared essentially normal at all periods of observation. All rats survived the 14-day observation period.

(2) 2150 mg./kg.—At this dosage level the rats exhibited hypoactivity and sedation within 30 minutes which continued over a 3-hour period. Diarrhea was observed at 24 hours. All animals survived the 14-day observation period.

(3) 4640 mg./kg.—At this dosage level all rats shown hypoactivity, sedation, dyspnea, vasodilatation, hypothermia and ataxia, reduced placing reflexes and cachexia. One rat died at 24 hours and an additional animal died at 96 hours. The remaining rats appeared normal by the 5th day of observation and survived the 14-day study period.

(B) Acute oral toxicity ($LD^{50}$)

| No. of rats, group | Time of Death | | | | | | |
|---|---|---|---|---|---|---|---|
| | Days | | | | | | Total |
| | 1 | 2 | 3 | 4 | 5 | 6 | 7 | 14 |

Dose (mg./kg.):

| | | | | | | | | |
|---|---|---|---|---|---|---|---|---|
| 101 | 5 | | | | | | | 0 |
| 215 | 5 | | | | | | | 0 |
| 464 | 5 | | | | | | | 0 |
| 1,000 | 5 | | | | | | | 0 |
| 2,150 | 5 | | | | | | | 0 |
| 4,640 | 5 | ½ | | | ¼ | | | 2 |

(C) Necropsy findings

Both rats which died at the 4640 mg./kg. dosage level were too severely autolyzed to permit accurate description of lesions.

In addition to the toxicity tests reported above, other preliminary animal studies were conducted to determine the effectiveness of β-styrenesulfonyl azide as hypotensive agent:

Example I

To test the hypotensive activity on intravenous administration of our new compound, mean arterial blood pressure in pentobarbitalized (35 mg./kg.) normotensive mongrel dogs was recorded from the left or right cannulated femoral artery via a heparinized saline bridge to a Statham P-23Db low volume displacement pressure transducer, which in turn was connected to an electronic recorder. The contralateral femoral vein was isolated and cannulated for injection of the test material and control substances.

A midline incision was made in the cervical area of the neck and both carotid arteries were exposed for occlusion. The right vagus nerve was divided and the peripheral stump passed through tubular platinum electrodes for stimulation. Respiration was recorded. Standard Lead II electrocardiograms were periodically recorded throughout a given experiment. Heart rates were recorded by tachograph.

One-half hour was permitted to elapse after dividing the vagus nerve for the animal to recover from surgery and the blood pressure to stabilize. Prior to intravenous administration of the test compound at least two control responses were obtained from each of the following procedures.

Systolic and diastolic decreases were approximately equal in magnitude to all dosages evaluated. While a dose-response relationship in the magnitude of fall in mean arterial blood pressure was completely lacking, a very distinct dose-response relationship was clearly evident in the duration of activity produced as dosages were increased.

The standard series did not appear to be altered to any appreciable degree at 1 and 2 mg./kg. dosages. At 5 mg./kg. acetylcholine depressor responses were transiently inhibited. In one dog at this dosage level, bilateral carotid occlusion pressor responses were completely blocked for a brief period, but recovered strongly prior to the return of the blood pressure to pre-injection control level. Other responses in the standard series were relatively unchanged at 5 mg./kg. dosages.

The electrocardiographic pattern (Lead II) was not changed at any dosage level of the test compound used in these experiments.

Heart and respiratory rates remained within normal limits during these trails.

The mechanism of action of $\beta$-styrenesulfonyl azide appears to be principally by a direct effect on the vascular bed since the injection of neurohumors such as epinephrine, angiotensin and acetylcholine remained relatively unchanged.

TABLE 1.—THE EFFECT OF INTRAVENOUS DOSAGES OF $\beta$-STYRENESULFONYL AZIDE ON THE ARTERIAL BLOOD PRESSURE OF ANESTHETIZED NORMOTENSIVE MONGREL DOGS

| Dose, mg./kg. | Systemic Arterial Blood Pressure | | | | | | | | | | | | | | |
|---|---|---|---|---|---|---|---|---|---|---|---|---|---|---|---|
| | Control | | | Fall | | | Change | | | Percent Change | | | Duration (min.) | | |
| | Sys. | Dias. | Mean | Sys. | Dias. | Mean | Sys. | Dias. | Mean | Sys. | Dias. | Mean | Sys. | Dias. | Mean |
| Dog No.: | | | | | | | | | | | | | | | |
| 301 .......... 1.0 | 145 | 95 | 112 | 70 | 30 | 43 | 75 | 65 | −69 | 52 | 68 | 62 | 45 | 45 | 45 |
| 354 .......... 1.0 | 135 | 95 | 108 | 90 | 35 | 53 | 45 | 60 | 55 | 33 | 63 | 51 | 17 | 17 | 17 |
| 281 .......... 1.0 | 140 | 85 | 103 | 70 | 50 | 57 | 70 | 35 | 46 | 50 | 41 | 45 | | | 1 >120 |
| Mean ........ | | | | | | | | | | | | | | | 31 |
| 352 .......... 2.0 | 180 | 100 | 127 | 100 | 40 | 60 | 80 | 60 | 67 | 44 | 60 | 53 | 85 | 33 | 85 |
| 355 .......... 2.0 | 160 | 100 | 120 | 105 | 45 | 65 | 55 | 55 | 55 | 33 | 55 | 46 | 37 | 4 | 30 |
| 353 .......... 2.0 | (Dog died following anesthesia) | | | | | | | | | | | | | | |
| Mean ........ | | | | | | | | | | | | | | | 58 |
| 302 .......... 5.0 | 165 | 110 | 128 | 115 | 55 | 75 | 50 | 55 | 53 | 30 | 50 | 41 | 83 | 70 | 83 |
| 351 .......... 5.0 | 110 | 85 | 93 | 27 | 12 | 16 | 83 | 73 | 77 | 75 | 86 | 83 | 166 | >234 | 195 |
| Mean ........ | | | | | | | | | | | | | | | 139 |
| 280 .......... 10.0 | 120 | 75 | 90 | 35 | 30 | 31 | 85 | 45 | −59 | 71 | 60 | 66 | | | >294 |
| 281 .......... 20.0 | 155 | 100 | 118 | 50 | 25 | 33 | 105 | 75 | −85 | 68 | 75 | 72 | | | >358 |

¹ Result disregarded in tabulation of mean duration of activity.

(1) Acetylcholine chloride, intravenously administered _____mcg./kg__ 2
(2) Histamine phosphate, intravenously administered _____mcg./kg__ 5
(3) L-epinephrine bitartrate, intravenously administered _____mcg./kg__ 2
(4) Angiotensin II (hypertensin), intravenously administered _____mcg./kg__ 1
(5) Peripheral vagal stimulation ____seconds__ 5–15
(6) Bilateral carotid occlusion _____do__ 15–30

The test compound was prepared for intravenous administration by dilution in liquid polyethylene glycol (Carbowax 300) as necessary for each dosage level administered. Volumes administered did not exceed 2 ml. at any one given injection. Comparable volumes of Carbowax 300 without compound were administred at least once for control purposes in each experimental trial. The control series of injected chemicals and procedures applied after each administration of test material as long as an effect persisted from the test compound. The test material was administered at various dosage levels to at least two dogs at each level in an attempt to produce a dose-response.

Since the duration of effect of 10 and 20 mg./kg. dosages could not be determined in primary blood pressure lowering studies by the intravenous route, dosages in this study were confined to 5 mg./kg. and lower.

Dosages of 1 through 5 mg./kg. in 6 dogs produced depressor effects ranging from 55 to 77 percent of the control mean with durations of activity ranging from 17 to 195 minutes.

Example II

To test the hypotensive activity on oral administration of $\beta$-styrenesulfonyl azide, normotensive mongrel beagle-type dogs of either sex weighing from 8 to 4 kg. were used. The dogs were lightly restrained in a canvas sling while systolic blood pressures were indirectly determined by the use of a Beckman FBR–2A Electrical Manometer, Beckman Infraton Signal Divider and a Sanborn single channel cardiovisette Model 100.

As in standard clinical practice, an occluding cuff was attached to the shaved base of the dog's tail and inflated beyond the point of arterial collapse. As the cuff pressure was released the first appearance of arterial pulsation, or sound and pulsation, was taken as an index of systolic blood pressure. Pulsations were oscillo-graphically recorded with the Sanborn Recorder.

An infraton microphone pickup was attached just below the occluding cuff directly over the middle coccygeal artery on the ventral surface of the tail. This instrument in effect replaces the stethoscope as used in conventional clinical practice. It transmits sound and pulse wave data directly to the Infraton Signal Divider. The occluding cuff is connected to the FBR–2A Electrical Manometer and is inflated by hand. Data from the pickup is selected by the signal divider and transmitted to the recorder.

An automatic, adjustable, linear pressure release valve in the FBR–2A Manometer releases cuff pressure at any chosen rate and simultaneously transmits information on the changing cuff pressure levels to the recorder.

All of the dogs in this study were trained to remain perfectly still and relaxed while blood pressures were being measured.

On the day of a given test control blood pressures were obtained prior to the oral administration in capsule form of the test compound. All subsequent pressures after compound administration were compared to the mean control values obtained just prior to treatment. Blood pressures were obtained after compound administration at 30 minutes, 60 minutes and hourly thereafter as long as a response on the blood pressure was detectable. Dogs once used in a given group were not used again for at least 2 days.

Pharmacodynamic signs such as changes in heart rate and respiratory rate, prolapse of the nictitating membrane, pupil size, vomiting, muscle tremors and behavorial changes were carefully noted.

Prior to the initiation of this study, all dogs in the study were subjected to the blood pressure recording technique for 7 consecutive hours for 4 consecutive days to establish a firm control baseline.

*Results (Table 1).*—The test compound was administered orally in capsule form to six dogs at dosages of 10, 25 or 50 mg./kg. Blood pressures were obtained as indicated above.

At 10 mg./kg. a fall in systolic blood pressure was detectable at 60 minutes and continued through 5 hours. A significant difference in systolic blood pressure was observed for the group at 2 hours after administration.

Heart and respiratory rates remained unchanged. No adverse pharmacodynamic signs were observed at this dosage level.

At 25 mg./kg. a decrease in systolic blood pressure was detectable at 30 minutes and persisted through 7 hours. However, only the 1 hour reading was significantly different from the control mean.

One dog (No. 10) vomited at 1 hour after administration. Dog No. 8 exhibited moderate diarrhea at 3 hours after administration. No other adverse pharmaco-dynamic or toxic signs were observed. Heart and respiratory rates remained within usual limits.

At 50 mg./kg. a decrease in group average systolic blood pressure was detectable within 30 minutes and became statistically significant at 1 through 7 hours. At 8 hours a decrease was still apparent but no longer mathematically significant.

Dogs Nos. 2 and 5 emesed at 2 and 4 hours, respectively, after administration of β-styrenesulfonyl azide. No other adverse pharmacodynamic or toxic signs were observed. Heart and respiratory rates remained within the usual limits.

β-Styrenesulfonyl azide has been shown to produce a decrease in systemic arterial blood pressure from both the intravenous and oral routes of administration. The compound produces a rapid onset and prolonged duration of activity.

BLOOD PRESSURE LOWERING PROPERTIES IN THE TRAINED UNANESTHETIZED NORMOTENSIVE MONGREL DOG

TABLE 2.—INDIRECT SYSTOLIC BLOOD PRESSURE CHANGES INDUCED BY ORAL DOSAGES OF β-STYRENESULFONYL AZIDE IN NORMOTENSIVE MONGREL DOGS

| Dog No. | Control | Blood Pressure (mm. Hg.) Time (hours) | | | | | | | |
|---|---|---|---|---|---|---|---|---|---|
| | | 1 | 2 | 3 | 4 | 5 | 6 | 7 | 8 |
| Test Compound, 25% on Lactose | | | | | | | | | |
| 10 mg./kg.: | | | | | | | | | |
| 1 | 123 | 138 | 124 | 125 | 106 | 119 | 118 | | |
| 2 | 160 | 160 | 159 | 147 | 170 | 144 | 165 | | |
| 3 | 145 | 128 | 139 | 126 | 137 | 148 | 145 | | |
| 4 | 168 | 124 | 117 | 118 | 107 | 127 | 116 | | |
| 5 | 117 | 160 | 115 | 107 | 118 | 124 | 128 | | |
| 6 | 148 | 144 | 143 | 115 | 139 | 124 | 142 | | |
| Mean | 143.5 | 142.3 | 132.8 | 123.0 | 129.5 | 131.0 | 135.7 | | |
| S.E. | 8.2 | 6.3 | 7.0 | 5.6 | 10.0 | 4.9 | 7.6 | | |
| P | | NS | NS | <.10 | NS | NS | NS | | |
| 25 mg./kg.: | | | | | | | | | |
| 7 | 139 | 138 | 124 | 131 | 137 | 143 | 126 | 145 | 146 | 152 |
| 8 | 140 | 134 | 117 | 117 | 118 | 122 | 117 | 124 | 126 | 128 |
| 9 | 127 | 118 | 116 | 118 | 145 | 146 | 147 | 144 | 124 | 138 |
| 10 | 147 | 128 | 124 | 143 | 137 | 127 | 134 | 142 | 135 | 145 |
| 11 | 136 | 119 | 108 | 86 | 115 | 114 | 123 | 116 | 129 | 128 |
| 12 | 168 | 146 | 143 | 161 | 132 | 145 | 152 | 154 | 148 | 151 |
| Mean | 142.8 | 130.5 | 122.0 | 126.0 | 130.7 | 132.8 | 133.2 | 137.5 | 134.7 | 140.3 |
| S.E. | 5.7 | | 4.8 | 10.5 | 4.8 | 5.6 | 5.7 | 5.9 | 4.2 | 4.4 |
| P | | NS | <.05 | NS | NS | NS | NS | NS | NS | NS |
| 50 mg./kg.: | | | | | | | | | |
| 1 | 135 | 136 | 106 | 107 | 105 | 117 | 105 | 139 | 107 | 122 |
| 2 | 162 | 166 | 146 | 128 | 140 | 147 | 147 | 141 | 160 | 165 |
| 3 | 164 | 140 | 124 | 126 | 141 | 134 | 136 | 134 | 126 | 126 |
| 4 | 162 | 117 | 113 | 107 | 120 | 117 | 123 | 133 | 115 | 128 |
| 5 | 123 | 116 | 128 | 120 | 140 | 113 | 97 | 88 | 104 | 158 |
| 6 | 160 | 138 | 138 | 128 | 127 | 124 | 128 | 128 | 141 | 141 |
| Mean | 151.0 | 135.5 | 125.8 | 119.3 | 128.8 | 125.3 | 122.7 | 127.1 | 125.5 | 140.0 |
| S.E. | 7.1 | 7.5 | 6.1 | 3.5 | 5.9 | 5.2 | 7.7 | 7.8 | 8.8 | 7.3 |
| P | | NS | <.05 | <.01 | <.05 | <.05 | <.05 | <.05 | <.05 | NS |

S.E. Standard Error of the Mean.
NS No Significance.

The β-styrenesulfonyl azide of this invention is readily prepared by reaction of the corresponding sulfonyl chloride (β-styrenesulfonyl chloride) with sodium azide in accordance with the equation:

This process is fullly described by Curtis et al., Journal Fur Praktische Chemie, neue folge, Band 125, pages 323–324 (1930). In general, a solution of about 1.2 mole of sodium azide, dissolved in a minimum of water, is added slowly with cooling to 1 mole of the sulfonyl chloride dissolved or suspended in about 200–300 milliliters of ethanol or acetone. The mixture is stirred for 1–2 hours at room temperature, after which sodium chloride is separated. The product is then diluted with about five times its volume of water, whereby the azide separates as crystals. Solid β-styrenesulfonyl azide can be recrystallized from ethanol, acetone, benzene, or hexane. Our new β-styrenesulfonyl azide may also be prepared by the nitrosation of the corresponding sulfonyl hydrazide as indicated by Curtis et al., supra, pages 326–327, in accordance with the equation:

It is preferable that our β-styrenesulfonyl azide be handled in dilute from since it may be mildly shock sensitive.

The β-styrenesulfonyl azide of this invention may be administered parenterally, orally, or as an inhalant or spray. For oral administration, it may be associated with a solid pharmaceutical vehicle in the form of a tablet, pill, powder, capsule or other dosage unit form which is suitable for oral administration. Suitable solid vehicles include lactose, cornstarch, microcrystalline cellulose, talc, stearic acid, magnesium stearate, gums, and the like. Coated tablets or pills are particularly suitable. Capsules are also particularly suitable. Typical pharmaceutical capsule casings such as gelatine may be used.

β-Styrenesulfonyl azide may also be administered in liquid form. For oral use suspensions containing about 15–40% sulfonyl azide in water are suitable. Conventional suspending agents can be added as stabilizers. These compositions can also contain a small amount of ethanol which will partially dissolve the sulfonyl azide. Liquid fats are unsuitable as vehicles since the sulfonyl azides are highly soluble in these fats and apparently tend to remain partitioned in the fatty phase of the chyle.

β-Styrenesulfonyl azide can be dissolved in polyethylene glycol (e.g., Carbowax 400), or some other pharmacologically inert vehicle in which it is soluble and this solution used for either oral or parenteral administration. β-Styrenesulfonyl azide concentrations of about 15–50% are suitable. It may also be administered by inhalation or nasal spraying of solutions or suspensions but it is normally not used in this manner because of the difficulty in controlling dosage. However, in acute situations where immediate reduction in blood pressure is necessary, inhalants and sprays may be appropriate.

Selection of the proper dosage for correction of hypertension is determined by various factors such as the severity of the disease and the desired duration of effect. The effective dosage for human patients is about 25–500 milligrams and preferably about 50–300 milligrams.

In order that our invention will be fully available to those skilled in the art, the preparation of our new compound through the method which we now prefer is briefly described:

A mixture of 20.2 g. β-styrenesulfonyl chloride, 9 g. sodium azide and 100 ml. acetone was stirred overnight at room temperature. 5 ml. of water was added and stirring continued for one hour. Then the mixture was poured on ice. The crystalline precipitate obtained was separated from the aqueous mother liquor by decantation, washed with $H_2O$ by decantation, dried in vacuo, and recrystallized from hexane to give 20 g. β-styrenesulfonyl azide, M.P. 39–40° C.:

N calculated, 20.08%. N found, 20.05%.

What is claimed is:

1. β-Styrenesulfonyl azide.
2. A hypotensive composition comprising an effective amount of β-styrenesulfonyl azide and an inert compatible pharmaceutically acceptable carrier therefor.
3. The composition of claim 2 containing about 25–500 milligrams of β-styrenesulfonyl azide.
4. The composition of claim 2 containing about 50–300 milligrams of β-styrenesulfonyl azide.
5. The method of combatting hypertension in a human subject afflicted therewith which comprises administering to said subject an effective amount of β-styrenesulfonyl azide.
6. The method of claim 5 wherein said β-styrenesulfonyl azide is administered to said subject orally.
7. The method of claim 5 wherein said β-styrenesulfonyl azide is injected intravenously.
8. The method of claim 5 wherein about 25–500 milligrams of β-styrenesulfonyl azide is administered to said subject.
9. The method of claim 5 wherein about 50–300 milligrams of β-styrenesulfonyl azide is administered to said subject.

References Cited

UNITED STATES PATENTS 2,830,029   4/1958   Adams _____ 260—349

ALBERT T. MEYERS, Primary Examiner

J. D. GOLDBERG, Assistant Examiner

U.S. Cl. X.R.

260—349

UNITED STATES PATENT OFFICE
CERTIFICATE OF CORRECTION

Patent No. 3,471,616            Dated October 7, 1969

Inventor(s) Theodor Weil and Hugo Stange

It is certified that error appears in the above-identified patent and that said Letters Patent are hereby corrected as shown below:

Column 2, line 58, add as first line after the Table
--$LD_{50}$ - 4640 mg./kg. Confidence Limits - Not obtainable.--

Column 4, line 21, "trails" should read --trials--.

Column 3, line 34, Table 1 under Dog No., "281" should read --280--.

Column 6, line 21, Table 2 the heading of the first column after Control column should contain --1/2--.

Column 6, line 53, "$RSO_2Cl+NaN_3RSO_2N_3+NaCl$" should read --$RSO_2Cl + NaN_3 \rightarrow RSO_2N_3 + NaCl$--.

Column 6, line 71, "$RSO_2NHNH_2+HNO_2RSO_2N_3+2H_2O$" should read --$RSO_2NHNH_2 + HNO_2 \rightarrow RSO_2N_3 + 2H_2O$--.

SIGNED AND SEALED
DEC 22 1970

(SEAL)
Attest:

Edward M. Fletcher, Jr.
Attesting Officer

WILLIAM E. SCHUYLER, JR.
Commissioner of Patents